US009087299B2

(12) United States Patent
Uppalli et al.

(10) Patent No.: US 9,087,299 B2
(45) Date of Patent: *Jul. 21, 2015

(54) INFERRING CONNECTIVITY IN THE PRESENCE OF CONFLICTING NETWORK DATA

(71) Applicant: Riverbed Technology, Inc., San Francisco, CA (US)

(72) Inventors: Raghavendra B. Uppalli, Cary, NC (US); James Mark Shaw, Cary, NC (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,886

(22) Filed: Apr. 23, 2014

(65) Prior Publication Data
US 2014/0236878 A1 Aug. 21, 2014

Related U.S. Application Data

(63) Continuation of application No. 13/430,541, filed on Mar. 26, 2012, now Pat. No. 8,743,736, which is a continuation of application No. 12/498,786, filed on Jul. 7, 2009, now Pat. No. 8,144,627.

(60) Provisional application No. 61/079,846, filed on Jul. 11, 2008.

(51) Int. Cl.
*H04L 12/28* (2006.01)
*G06N 5/04* (2006.01)
*H04L 12/24* (2006.01)
*H04Q 3/00* (2006.01)

(52) U.S. Cl.
CPC ........ *G06N 5/04* (2013.01); *H04L 41/12* (2013.01); *H04Q 3/0062* (2013.01); *Y02B 60/43* (2013.01)

(58) Field of Classification Search
CPC ........ G06N 5/04; H04L 41/12; H04Q 3/0062; Y02B 60/43
See application file for complete search history.

(56) References Cited

U.S. PATENT DOCUMENTS

| | | |
|---|---|---|
| 6,377,987 B1 | 4/2002 | Kracht |
| 6,516,345 B1 | 2/2003 | Kracht |
| 6,725,264 B1 | 4/2004 | Christy |
| 6,898,183 B1 | 5/2005 | Garakani |
| 6,944,130 B1 | 9/2005 | Chu |
| 7,069,343 B2 | 6/2006 | Goringe et al. |

(Continued)

*Primary Examiner* — Robert Wilson
(74) *Attorney, Agent, or Firm* — Park, Vaughan, Fleming & Dowler LLP

(57) ABSTRACT

The connectivity information provided by a variety of inference engines is integrated to provide a set of inferred links within a network. A consolidation is performed among inference engines that operate at a base level of connectivity detail to create a model of the network at this base level. The connectivity information provided by inference engines at each subsequent higher level of connectivity abstraction is then overlaid on the base level connectivity. By separately consolidating the connectivity information at each level of abstraction, the rules for dealing with conflicts can be simplified and/or better focused to resolve the conflict. By assuming that the more detailed lower level information is likely to be more accurate, rules can be developed to modify the connectivity models produced by the higher level techniques to conform to the lower level connectivity details while still maintaining the integrity of the higher level connectivity models.

17 Claims, 3 Drawing Sheets

(56) References Cited

U.S. PATENT DOCUMENTS

| | | |
|---|---|---|
| 7,383,574 B2 | 6/2008 | Burrows et al. |
| 7,397,802 B2 | 7/2008 | Maeno |
| 7,894,369 B2 | 2/2011 | Shaw |
| 8,089,904 B2 | 1/2012 | Balasurbramaniam et al. |
| 8,144,627 B2 * | 3/2012 | Uppalli et al. ................ 370/255 |
| 8,743,736 B2 * | 6/2014 | Uppalli et al. ................ 370/254 |
| 2010/0008257 A1 * | 1/2010 | Uppalli et al. ................ 370/254 |
| 2012/0182903 A1 * | 7/2012 | Uppalli et al. ................ 370/255 |
| 2014/0236878 A1 * | 8/2014 | Uppalli et al. ................ 706/46 |

* cited by examiner

INFERRING CONNECTIVITY IN THE PRESENCE OF CONFLICTING NETWORK DATA

This application is a continuation of U.S. patent application Ser. No. 13/430,541, filed 26 Mar. 2012, now U.S. Pat. No. 8,743,736, which is a continuation of U.S. patent application Ser. No. 12/498,786, filed 7 Jul. 2009, now U.S. Pat. No. 8,144,627, which claims the benefit of U.S. Provisional Patent Application 61/079,846, filed 11 Jul. 2008, each of which is incorporated by reference herein.

BACKGROUND AND SUMMARY OF THE INVENTION

This invention relates to the field of network analysis, and in particular to a system and method for inferring the connectivity among devices of a network.

The continually increasing usage of communications has increased the demand for efficient and reliable networks; consequently, there is an increased demand for management tools to support such networks.

Advanced networking techniques, including, for example, the ability to create virtual networks and virtual connections, increases the scope of a network manager's responsibilities. It is common for a corporate network manager to be responsible for a corporate network that spans the country, or spans the world. This extended scope of responsibilities generally leads to a delegation of responsibilities for physically connecting the myriad devices used at each locale, and for logically connecting groups of network nodes without regard to their locales.

To effectively manage a network, the network manager must be aware of how the devices of the network are connected to each other, both physically and logically. Generally, a model of the network is created, and tools are provided for viewing the model from different perspectives, making changes to components and/or the connectivity among the components, simulating the performance of the network, and so on. The creation of a model of a network comprising hundreds or thousands of devices, however, can be an onerous task, and keeping the model up to date can be even more difficult.

Techniques have been developed to automate the building of a model of a network by collecting information from the actual devices on the network regarding their configuration and inferring connectivity based on this information. However, these techniques generally require a substantial amount of human intervention, because the data collected is generally incomplete, and often conflicting. Different types of devices have different roles to perform in a network, and therefore their configurations will be directed to the particular role that they are performing. For example, the configuration of a network router will contain the information required by the router to determine which router or layer-3 device should receive each received packet, based on an address contained in the message; the configuration of a network switch, on the other hand, will contain the information required by the switch to establish connections to the next physical device, without regard to the particular type of device or protocol layer. Compounding the problem of mixed forms of connectivity information dependent upon the type of device, different vendors of the same type of device may use different techniques for establishing or monitoring the configuration of their devices.

FIGS. 1A-1D illustrate an example of the mix of information provided by different sources of connectivity information. In these illustrations, four routers R1, R2, R3, and R10, and one switch S1 are identified; interfaces on each device are labeled Fe0/1, Fe0/2, etc. The acquired information is illustrated on the left, with the resultant inferred connectivity on the right. The term 'inference engine' is used herein to define a particular process or device that processes a given set of information to produce an inferred set of connections (topology) based on that information.

FIG. 1A illustrates connectivity inferred by an engine that processes IP addressing information, indicating that R1-Fe0/1, R2-Fe0/1 and R3-Fe0/1 are in the same subnet. FIG. 1B illustrates connectivity information from an engine that processes forwarding table information, indicating that R2-Fe0/1 is connected to S1-Fe0/2, and that R3-Fe0/1 is connected to S1-Fe0/3. FIG. 1C illustrates connectivity information from an engine that processes neighbor discovery information, indicating that R2-Fe0/1 is connected to R3-Fe0/1. FIG. 1D illustrates connectivity information from an engine that processes tunnel information, indicating that a tunnel exists between R2 and R10.

As can be seen, none of the individual inference engines are able to determine the entire physical connectivity of the elements R1, R2, R3, R10, and S1 in this network. And, FIG. 1C appears to conflict with FIG. 1B, apparently because the switch S1 is transparent to the neighbor discovery process (not a 'neighbor', per se).

It would be advantageous to be able to infer more of the connectivity of a network than current techniques provide. It would also be advantageous to be able to resolve apparent conflicts in reported connectivity information. It would also be advantageous to infer connections with some degree of confidence even when there is no direct reference or data indicating the existence of such a connection.

These advantages, and others, can be realized by a method and system that integrates the connectivity information provided by a variety of connectivity inference techniques, and is able to resolve conflicts as they arise during the consolidation process. A consolidation is performed among inference engines that operate at a base level of connectivity detail to create a model of the network at this base level. The connectivity information provided by inference engines at each subsequent higher level of connectivity abstraction is then overlaid on the base level connectivity. By separately consolidating the connectivity information at each level of abstraction, the rules for dealing with conflicts can be simplified and/or better focused to resolve the conflict. By assuming that the more detailed lower level information is likely to be more accurate, rules can be developed to modify the connectivity models produced by the higher level techniques to conform to the lower level connectivity details while still maintaining the integrity of the higher level connectivity models.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions. The drawings are included for illustrative purposes and are not intended to limit the scope of the invention.

DETAILED DESCRIPTION

Figure 1A:
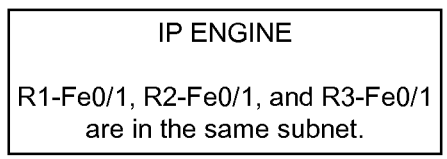
FIGS. 1A-1D illustrate example connectivity determinations provided by inference engines that process connectivity information from different sources.
Figure 1A:
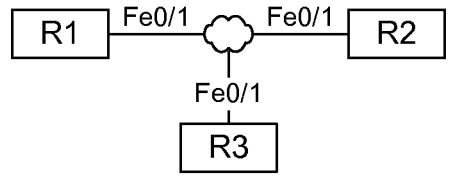

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

As noted above, a variety of techniques are available for determining connectivity, the different techniques generally being based on different sets of available information from which to infer connections between elements. Even though each technique may present an accurate representation of the connections among network elements, the definition/interpretation of "is connected to" will vary, generally based on the context of the data used to create the inference. For example, in the context of a defined tunnel between nodes A and B, it is said that "A is connected to B", but this does not mean that there are no intermediate nodes between nodes A and B. In like manner, if a router C indicates that router D is a 'next-hop' for messages addressed to a given block of addresses, it can be inferred that C must be directly coupled to D, however, this 'direct' coupling may include switches and other devices that are transparent to the routers.

This invention is premised on the observation that these differences in connectivity 'context' are a primary cause of apparent conflicts among the inferred connections provided by the different techniques. Conversely, within a given context, the meaning of "is connected to" is fairly consistent, and the causes of conflict are generally specific to the particular inference techniques, rather than a difference in the meaning of 'connection'. Alternatively stated, if the inference techniques are segmented into levels, wherein each level is preferably defined as a level of detail in which the meaning of "is connected to" is fairly consistent, the connectivity inference task can be partitioned into within-level tasks and between-level tasks, such that the problems addressed in each are specific to the given task.

In this disclosure, the distinction of connection levels use the terms 'physical', 'IP', and 'logical', physical being the level at which the connectivity is most detail, logical being the level at which the connectivity is least detailed, and IP being a level between the most and the least detailed. However, as will be recognized by one of skill in the art in view of this disclosure, this invention does not depend upon this particular segregation of levels in the available information, and any other technique for distinguishing different levels of connection detail can be used. In like manner, the use of the term 'IP' for the intermediate level of detail is for convenience and ease of understanding, because a variety of techniques are available for determining connectivity based on IP addresses. One of skill in the art will recognize that the concepts presented herein are not limited to the use of IP addressing, per se.

A variety of techniques exist for inferring connectivity using different sources of data. Among the most common sources of connectivity information are:

a) IP addressing data: In terms of the OSI protocol standard, the IP addressing data provides a Network layer view of the network. This data can be obtained from the device configuration files, and is herein termed "IP-level" information, for convenience.

b) Neighbor discovery data: Determines and provides information about neighbor devices connected to a device and hence assists in inferring a physical level topology. This information is typically vendor specific (e.g. Cisco Discovery Protocol or CDP), and other vendor devices will often be omitted.

c) Forwarding table data: Contains the physical addresses of interfaces that are reachable through another interface, and can be used to infer a physical level topology. Though the data is not vendor-specific, it is often incomplete and changes dynamically.

d) Link Layer Discovery Protocol (LLDP) data: Provides physical level connectivity data in multi-vendor device networks but is very sparsely implemented.

e) Logical tunnel and virtual circuit definitions: Provides logical connectivity data, with little or no detail regarding the physical level topology.

f) BGP neighbor configuration: Provides logical connectivity data between an enterprise and a provider network.

Figure 2:
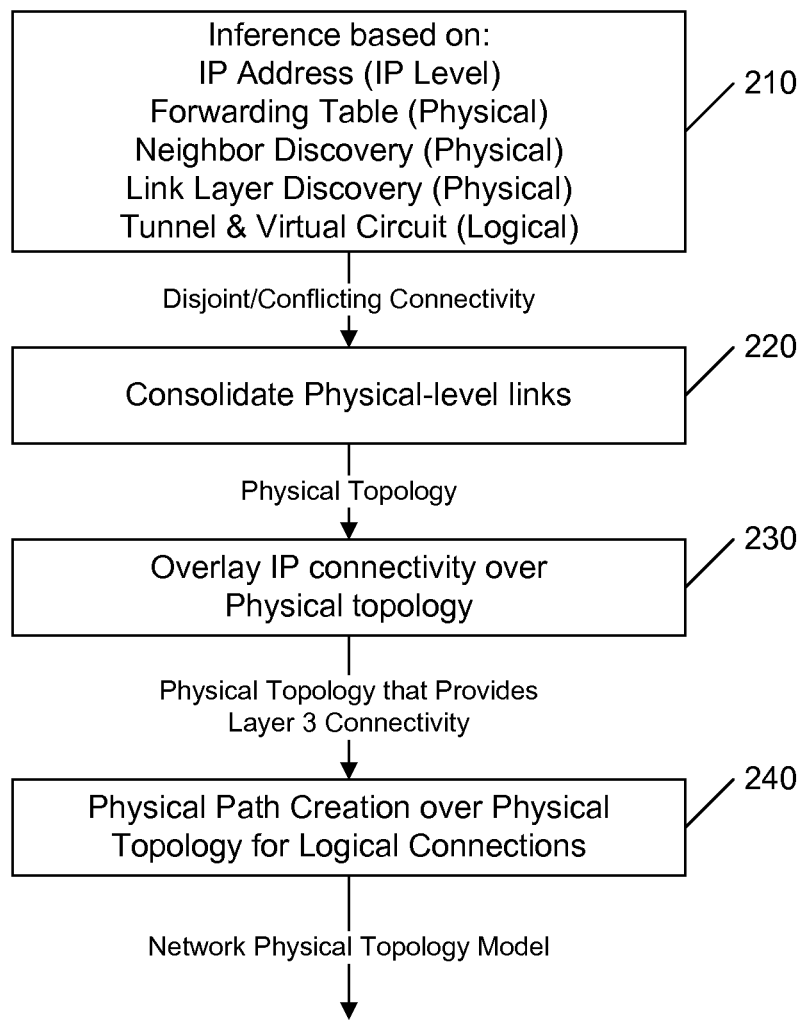
FIG. 2 illustrates an example flow diagram for an inference integration engine in accordance with this invention.

FIG. 2 illustrates an example flow diagram of a connectivity inference integration system in accordance with aspects of this invention. At 210, each of a set of connectivity inference techniques are applied, based on the currently available sources of information. For example, U.S. patent application publication 2007-0041355, "NETWORK PHYSICAL CONNECTION INFERENCE FOR IP TUNNELS", by James Shaw, and 2008-0031156, "LINK INFERENCE IN LARGE NETWORKS BASED ON INCOMPLETE DATA", by Rajesh Balasubramaniam and James Shaw, each teach determining connectivity based on forwarding table data.

Block 210 will provide multiple sets of connectivity information, each set being termed a connectivity graph[1]. The connectivity graphs produced by the different sources of information are determined/inferred substantially independent of each other, and, as noted above in the examples of FIGS. 1A-1D, often contain connections that do not directly correspond to the actual physical connections, per se. Each inference technique will provide an inferred set of connections at a particular connectivity level. As used herein, the defined levels of connectivity are physical, IP, and logical.

[1]The term 'graph' is used herein in the general mathematical sense, meaning a description of connections among items, and does not imply that a drawing, per se, is created.

At 220, all of the connectivity graphs produced at the lowest level (physical level in this example embodiment) are consolidated to form a consolidated connectivity graph based on the sources of information at the physical connectivity level. By separately processing the physical level information, techniques for resolving conflicts/omissions among the various sources can be tailored to the likely causes of within-level conflicts. Upon completion of the consolidation, the physical topology defined by all of the physical level information will be defined; this topology, however, is likely to have gaps, as viewed from a network perspective.

At 230, the IP level connectivity graphs are 'overlaid' upon the consolidated graph of physical level connectivity. The term overlaid as used herein describes a 'fitting' of the IP level graph to conform to the consolidated physical level graph, rather than attempting to reconcile differences between the graphs. That is, because it is recognized that the definition of a 'connection' at each different connection level differs, the connections defined at each level are permitted to differ, and no attempt is made to force an equivalence. For example, if the physical level consolidated graph indicates that A is connected to B, and B is connected to C, this graph is consistent with, but different from, an IP level graph that indicates that A is connected to C, and no conflict exists. It is significant to note that if all of the graphs were processed independent of levels, these A-C and A-B-C connections would be considered to conflict, and a conflict resolution process would be invoked to determine which one of the determined connections was correct. Conversely, in this invention, provided that the physical level graph can be determined to contain a set of one or more connections that are consistent with the determined IP level connection, the different connection graphs are not considered to conflict.

In addition to assuring consistency and/or identifying true inconsistencies, the overlaying of the determined IP level connectivity upon the consolidated physical level graph also serves to provide additional connectivity information. If, for example, the IP level graph indicates that A is connected to C, while the physical level graph indicates that the only connection to A is a link to B, the overlaying will provide an inferred connection between B and C, provided that the consolidated graph does not indicate that B cannot be connected to C.

In a preferred embodiment, the source/cause of each inferred connection will be identified, so that the processing of subsequent IP level information will appropriately interpret the 'malleability' of the inferred connection. For example, a determined/inferred physical level connection is generally considered to be substantially 'fixed', whereas a determined/inferred physical level connection based on the IP level connectivity may be modified by subsequently processed IP level information. In like manner, a degree of malleability among the inferred connections within a given level can be identified based on the particular process used to reach the inference.

At the end of block 230, the consolidated/overlaid graph will identify the physical level topology based on the physical and IP level information, and at block 240, the logical graphs are processed to ascertain that the determined physical topology can support each logical connection. Again, because the lower level information is considered to be potentially more detailed, differences between a logical connection and the connections in the consolidated graph are not considered conflicts unless the consolidate graph cannot support the logical connection.

As in the overlaying of IP level connectivity information, the process of verifying that each logical connection can be realized by finding at least one physical path between the ends of the logic connection may result in the identification of further inferred physical level connections, provided that there is no indication that the inferred connection cannot be made.

At the end of block 240, the consolidated graph will identify the physical topology based on physical level, IP level, and logical level information. This topology can then be used in any of a variety of network analysis tools to model the propagation of messages across the network, to estimate and analyze the inherent reliability provided by the particular topology, and so on.

Figure 1B:
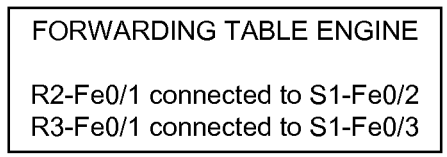
Figure 1B:
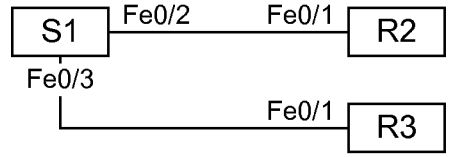
Figure 1C:
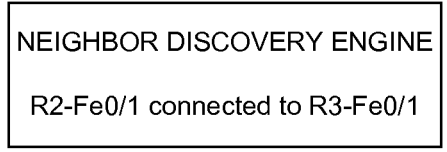
Figure 1C:
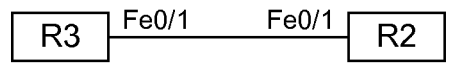
Figure 1D:
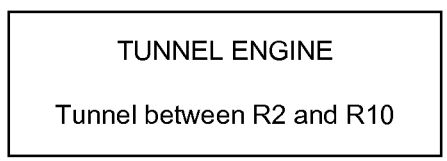
Figure 1D:
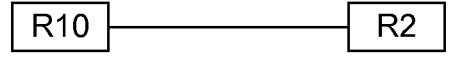
Figure 3:
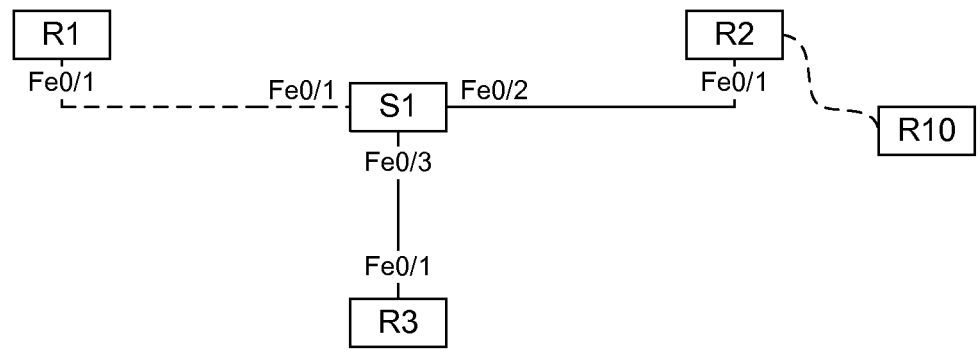
FIG. 3 illustrates an example connectivity determination based on an integration of the connectivity determinations of FIGS. 1A-1D in accordance with this invention.

FIG. 3 illustrates an example integration of the connectivity information of FIGS. 1A-1D. In this example, FIG. 1A illustrates IP level information, FIGS. 1B and 1C illustrate physical level information, and FIG. 1D illustrates logical level information.

In accordance with the flow diagram of FIG. 2, the physical level information is consolidated first, independent of the IP level and logical information. Generally, the connections inferred by the neighbor discovery process are highly reliable, and conflicts would typically be resolved in favor of this reliable information. Connections inferred from forwarding table information, on the other hand, are often based on unverifiable assumptions, such as an assumption that the sending and receiving paths between nodes are symmetric. However, it is also known that the neighbor discovery process only discovers neighbors of a particular type, other devices being 'transparent' to the discovery process. Accordingly, a 'rule' for reconciling neighbor discovery information and forwarding table information could be: reconcile in favor of the connectivity defined by the neighbor discovery information, except if the forwarding table indicates one or more intermediate devices that are known (or assumed) to be transparent to the neighbor discovery process. In this example, assuming that S1 is not a device that would be recognized by the neighbor discovery process, the consolidated physical level connectivity will correspond to the graph illustrated in FIG. 1B.

After consolidating the physical level connectivity, the IP level connectivity based on IP addressing data will be overlaid upon the consolidated graph. In this case, the IP level connectivity indicates that R2-Fe0/1 is connected to R3-Fe0/1, and the consolidated graph of FIG. 1B indicates that this connection can be achieved via the R2-Fe0/1-S1-Fe0/2-S1-Fe0/3-R3-Fe0/1 connection. Accordingly, because it is acknowledged that connections at different connectivity levels need not be identical, a conflict does not exist with regard to the IP level R2-Fe0/1-R3-Fe0/1 connection.

In this example, there is insufficient information to determine how R1-Fe0/1 is connected to R2-Fe0/1 and R3-Fe0/1. However, given that the IP level connectivity information indicates that such a connection exists, it is reasonable to assume, without any evidence to the contrary, that R1 is also connected to the switch S1 of the consolidated physical level graph. This inferred connection is illustrated by the dashed line coupling R1 and S1. As noted above, this connection may be modified by subsequently processed IP level information, whereas the connections derived from the physical level information are substantially fixed relative to the processing of IP level information.

It is significant to note that the processes for resolving conflicts within a level will generally be specific to each particular inference tool or inference source, whereas the processes for resolving between-level conflicts are generally specific to the level, and not to the processes within the level. In this example, by segregating the processing based on levels, there is no need to define a rule for resolving conflicts between IP connectivity and forwarding table connectivity and between IP connectivity and neighbor discovery connectivity. Once the physical level connectivity is consolidated, the rules for each IP level type can be formulated with regard to the consolidated physical level connectivity, rather than to each of the different types/sources within the physical level.

The logical information of FIG. 1D is similarly processed, after overlaying the connectivity information from each of the IP level sources. Because there is no physical level or IP level information regarding device R10, the logical connection between R2 and R10 is merely illustrated as a dashed line. In actuality, the network may be structured with R10 physically connected to R3, such that the connection between R2 and R10 includes the connections from R2-Fe0/1 to S1-Fe0/2, the connection from S1-Fe0/3 to R3-Fe0/1, and a connection from R3 to R10, but because there is no evidence to suggest this actual connection, such an inference is not made at this point in the analysis.

Figure 4:
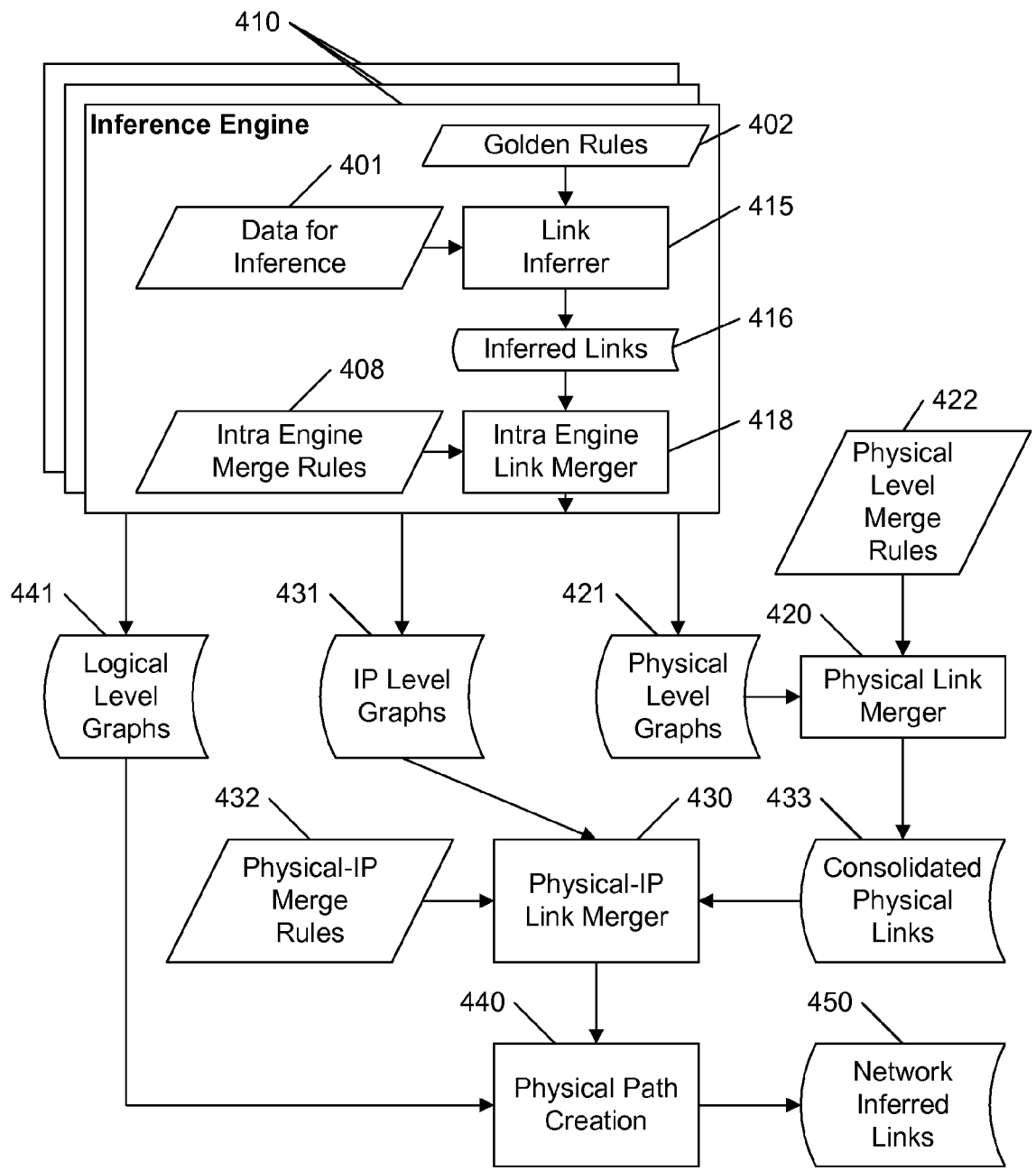
FIG. 4 illustrates an example block diagram of an inference integration engine in accordance with this invention.

FIG. 4 illustrates an example block diagram of an inference integration engine that includes a plurality of connectivity inference engines 410 and a series of processes 420, 430, 440 for integrating the connectivity information provided by these engines.

Each inference engine 410 preferably includes access to a source of data 401 for performing the inference, and a link inferrer 415 that is configured to infer links 416 based on this data 401. The link inferrer 415 is also preferably configured to access any 'golden rules' 402 that can be defined to supersede particular inferences based on the known aspects of the network. For example, if a user has a source of known connections, those known connections can be included in the golden rules 402 to ease the task of the inferrer 415, and to assure that the inferrer does not identify an inferred link 416 that conflicts with these golden rules 402.

Golden rules 402 are also useful when there is insufficient data to resolve link conflicts, or when the available data is misleading. Similarly, there may be conflicting or overlapping data within the same inference engine 410 that may lead to ambiguous links being generated by the engine. For example, neighbor discovery data for different sub interfaces on a physical interface may report that they are connected to different neighbors. While this is logically correct, it cannot be physically true—an interface can at most be connected to one other interface. These golden rules 402 may be created and modified at any time, thereby allowing for improved link inferences as problems are identified with each running of the inference integration engine for a particular network. In a preferred embodiment of this invention, when a conflict cannot be resolved within the integration system, the user is notified and is provided the opportunity to resolve the conflict. When the user provides a resolution, the user is provided the option of adding the rule to the inference engine 410, either as a golden rule 402 for the particular network being analyzed, or an intra-engine rule 408 for all networks.

Within a particular inference engine 410, the inferring process and the resolution of conflicts are preferably treated as separate processes. That is, the inferrer 415 preferably generates as many inferences as it can, without immediate regard for whether a new inference conflicts with a prior inference. These inferences 416 are processed by an intra-engine link merger 418 that is configured to resolve conflicts, and to determine whether additional links may be inferred based on the merged set of links. This conflict resolution process is facilitated by one or more intra-engine merge rules 408 that are specifically targeted for resolving conflicts within the particular inference engine 410, independent of the other inference engines 410.

Each inference engine 410 provides a connectivity graph, which, depending upon the source of data 401 will be a physical, IP, or logical level connectivity graph. As noted above, other levels may alternatively be defined, based on the characteristics of the particular sources 401 or inferrers 415. In a preferred embodiment, the physical level graphs 421, IP level graphs 431, and logic level graphs 441 include an identification of the end points of each inferred or defined link, as well as metadata that can be used to facilitate the subsequent processing of these graphs.

The metadata associated with each inferred link preferably includes the nature and history of each inferred link. The nature of the link typically includes the type of link (physical level, IP level, logical level, etc.), the type of interfaces on the link (physical, logical, aggregate, etc.), and the basis of the inference (based on data about a physical interface, a sub-interface, a combined interface, etc.). The history of the link includes the evolution of the link during the inference process, including, for example, an identification of the origin of the inference and an identification of each subsequent modification to the inference.

In a preferred embodiment, the physical level link merger 420 infers the best physical level topology upon which subsequent IP level and logical connections can be realized. This involves consolidating the topologies produced by various engines 410 that operate on physical level connectivity data. In a preferred embodiment, a set of physical level merge rules 422 are used to disambiguate or resolve conflicting links 421 that may be produced by the different inference engines 410 operating on physical level data, to produce a consolidated set of physical level links 433.

Once the physical level topology 433 is established, the IP level inferred topology is overlaid on it, via the Physical-IP level merger 430. The merger 430 is configured to determine whether each inferred IP level link is realizable via the consolidated physical level links, and if not, to determine new links that are inferable based on the existence of the IP level link, as discussed above. A set of physical-IP level merge rules 432 facilitate this merging process. At this stage 430, the output consolidated connectivity includes the links inferred to realize the physical level connectivity, consistent with the inferred IP level connectivity.

After the physical-IP level merge is completed, the logical links, such as Tunnels, MPLS Label Switched Paths, ATM virtual circuits, and so on, are processed to verify that they are each realizable given the inferred consolidated physical level topology. For each logical connection, the physical path creation component 440 determines whether the inferred physical level connectivity is sufficient to realize the connection. If so, there is no additional task performed in this stage for that link. If not, additional links are created in order to realize the logical connections.

It is significant to note that the path creation/determination is performed based on the logical-level connectivity, while still assuring that the inferred physical and IP level topology is maintained. The final version of the consolidated links 450 represents a set of links that conform to the most detailed source of connectivity information, and provide the connectivity required to support the connections implied by the sources of information at higher levels of abstraction.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A non-transitory computer-readable medium that includes a program that, when executed by a processor, causes the processor to:

obtain sets of configuration data of a plurality of devices in a network; each set of configuration information being associated with a hierarchical level of connectivity information;

consolidate the sets of configuration data associated with a first hierarchical level to create a connectivity graph, consolidate the sets of configuration data associated with a second hierarchical level to identify connections at the second hierarchical level, for each identified connection at the second hierarchical level:
 determine whether the identified connection is consistent with the first-level connectivity graph, and
 if consistent, modify the connectivity graph to include the identified connection, wherein one or more user-defined golden rules are received, and any conflicts are resolved so as to be consistent with the golden rules.

2. The medium of claim 1, wherein the program causes the processor to infer an additional connection at the first hierarchical level to enable the identified connection at the second hierarchical level, and modify the connectivity graph by including the inferred additional connection.

3. The medium of claim 1, wherein if a conflict exists between the connectivity graph and the identified connection at the second hierarchical level, the program causes the processor to resolve the conflict so as to be consistent with the connectivity graph.

4. The medium of claim 1, wherein the program causes the processor to:

consolidate the sets of configuration data associated with a third hierarchical level to identify connections at the third hierarchical level, and after the connectivity graph has been modified to include the identified connections at the second hierarchical:
 for each identified connection at the third hierarchical level:
  determine whether the identified connection at the third hierarchical level is consistent with the connectivity graph, and
  if consistent, further modify the connectivity graph to include the identified connection at the third hierarchical level.

5. The medium of claim 4, wherein the program causes the processor to infer an additional connection at the first hierarchical level to enable the identified connection at the third hierarchical level, and modify the connectivity graph by including the inferred additional connection.

6. The medium of claim 4, wherein if a conflict exists between the connectivity graph and the identified connection at the second hierarchical level, the program causes the processor to resolve the conflict so as to be consistent with the connectivity graph.

7. The medium of claim 1, wherein the first hierarchical level corresponds to physical-level links, and the second hierarchical level corresponds to IP-level links.

8. A method comprising:

obtaining, by a network analysis system, sets of configuration data of a plurality of devices in a network; each set of configuration information being associated with a hierarchical level of connectivity information;

consolidating, by the network analysis system, the sets of configuration data associated with a first hierarchical level to create a connectivity graph in a computer-readable memory element, consolidating, by the network analysis system, the sets of configuration data associated with a second hierarchical level to identify connections at the second hierarchical level, for each identified connection at the second hierarchical level:
 determining whether the identified connection is consistent with the first-level connectivity graph, and
 if consistent, modifying the connectivity graph in the computer-readable memory to include the identified connection, wherein the first hierarchical level corresponds to physical-level links, and the second hierarchical level corresponds to IP-level links.

9. The method of claim 8, including inferring an additional connection at the first hierarchical level to enable the identified connection at the second hierarchical level, and modifying the connectivity graph by including the inferred additional connection.

10. The method of claim 8, including resolving a conflict between the connectivity graph and the identified connection at the second hierarchical level so as to be consistent with the connectivity graph.

11. The method of claim 8, including receiving one or more user-defined golden rules, and resolving any conflicts so as to be consistent with the golden rules.

12. The method of claim 8, including:

consolidating the sets of configuration data associated with a third hierarchical level to identify connections at the third hierarchical level, and after the connectivity graph has been modified to include the identified connections at the second hierarchical level:
 for each identified connection at the third hierarchical level:
  determining whether the identified connection at the third hierarchical level is consistent with the connectivity graph, and
  if consistent, further modifying the connectivity graph to include the identified connection at the third hierarchical level.

13. The method of claim 12, including inferring an additional connection at the first hierarchical level to enable the identified connection at the third hierarchical level, and modify the connectivity graph by including the inferred additional connection.

14. A system comprising:

a non-transitory computer readable medium having instructions;

a processor which upon executing the instructions performs the following:

obtaining sets of configuration data of a plurality of devices in a network; each set of the configuration information being associated with a hierarchical level of connectivity information;

consolidating the sets of configuration data associated with a first hierarchical level to create a connectivity graph in the non-transitory computer-readable memory;

consolidating the sets of configuration data associated with a second hierarchical level to identify connections as the second hierarchical level, for each identified connection at the second hierarchical level;

determining whether the identified connection is consistent with the connectivity graph, if consistent, modifying the connectivity graph in the non-transitory computer readable medium to include the identified connection, consolidating the sets of configuration data associated with a third hierarchical level to identify connections at the third hierarchical level, and after the connectivity graph has been modified to include the identified connections at the second hierarchical level;

for each identified connection at the third hierarchical level;

determining whether the identified connection at the third hierarchical level is consistent with the modified connectivity graph and if consistent, further modifying the modified connectivity graph to include the identified connection at the third hierarchical level, and inferring an additional connection at the first hierarchical level to enable the identified connection at the third hierarchical level, and modifying the connectivity graph by including the inferred additional connection.

15. The system of claim 14, wherein the non-transitory computer readable medium further comprises: first additional instructions which upon execution by the processor perform the following:

inferring an additional connection at the first hierarchical level to enable the identified connection at the second hierarchical level, and modifying the connectivity graph by including the inferred additional connection.

16. The system of claim 14, the non-transitory computer readable medium further comprising: second additional instructions which upon execution by the processor perform the following:

resolving conflicts between the connectivity graph and the identified connection at the second hierarchical level so as to be consistent with the connectivity graph.

17. The system of claim 14, wherein the first hierarchical level corresponds to physical-level links, and the second hierarchical level corresponds to Internet Protocol-level (IP-level) links.

* * * * *